May 17, 1949.　　　　R. M. GASSMANN　　　　2,470,392
TUBE CHAMFERING TOOL
Filed Oct. 25, 1945
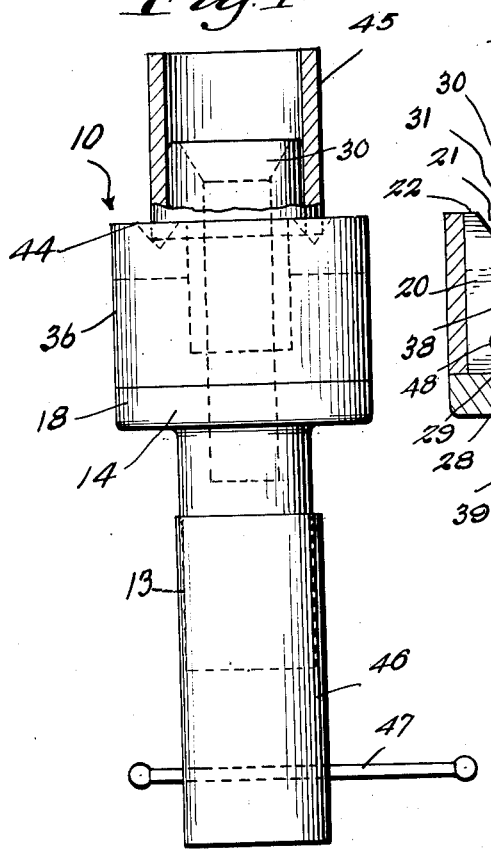
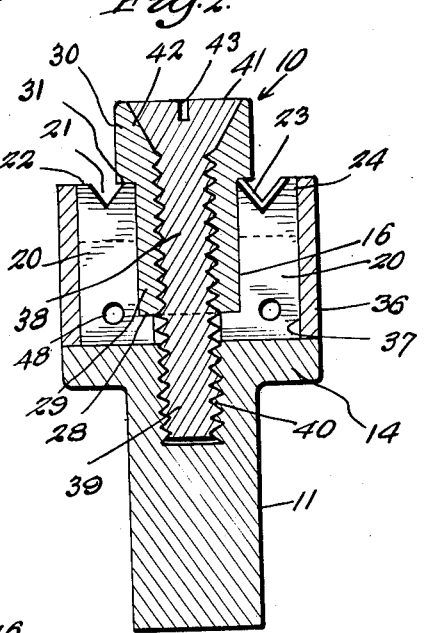
Inventor
RAYMOND M. GASSMANN
By Clarence A. O'Brien
and Harvey B. Jacobson
Attorneys Patented May 17, 1949

2,470,392

UNITED STATES PATENT OFFICE 2,470,392

TUBE CHAMFERING TOOL

Raymond M. Gassmann, Wilmette, Ill., assignor of one-fourth to Bernard M. Kollath, Roy Maier, and Albert P. Stein, Chicago, Ill.

Application October 25, 1945, Serial No. 624,449

3 Claims. (Cl. 77—73)

My present invention relates to mechanics' accessories and has for its object to provide a tool by means of which a tube may be chamfered on both inner and outer edges at one and the same time.

Another object of this invention is to provide a tool for forming a double chamfer in a single operation.

Another object of the device is to provide a reamer in which a desired number of cutter blades may be held according to the job to be performed or the material to be worked upon.

A still further object of the invention is to provide a double chamfering hand tool, which may also be used as a machine accessory.

Another object of my invention is to provide a cutting tool the blades of which are located out of contact with the hand of the operator thereof, thereby providing a safety first tool.

Other features and advantages will become more readily apparent from the following description and the accompanying illustrative drawings in which:

Figure 1 is an elevational view of my tool,

Figure 2 is a vertical sectional view thereof,

Figure 3 is a plan view of the device,

Figure 4 is a perspective view of a blade holder, and

Figure 5 is a detail similar view of a reamer blade.

In the above drawings as well as in the specification to follow, the same characters of reference indicate the same parts throughout.

While one embodiment of my invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of my device, which is to be limited only in accordance with the appended claims. And while I have stated the primary field of utility of my invention it remains obvious that it may be employed in any other capacity wherein it may be found applicable.

In the drawings, 10 indicates my tool which consists of a holder 11, which consists of a shank 12, having a rectangular free terminal 13, for engagement with any device by which it may be rotated for machine application. However the device is intended primarily as a hand tool to be used on the job, such, for instance, as connecting up refrigerators or other home appliances and electric devices. The shank 12 is provided with an enlarged plate 14, from the central portion 15', of which projects a series of spaced segments 15, through the center of which is a relatively large bore 16, for a purpose presently to be stated. Projecting annularly from the outer surfaces 17, of the elements 15, is a flange 18. All of the aforesaid elements are formed in one single unit.

The slots 19, between the said segments 15, are provided for receiving a series of reaming members 20, each having a V-shaped recess 21, in its upper edge 22, which recess is provided with opposing inclined converging blades 23 and 24. The lower end 25, of the cutter has projecting from its edge 26, a toe 27, which has double function of a guide into the slots 19, and a seat for the lower end 28, of a tubular blade retainer thimble 29. The pilot head 30, of member 29, provides an annular shoulder 31, adapted to seat upon all of the inner terminals 32, of the cutters 20, when the cutters are placed and the thimble 29, is seated in the said bore 16. It is to be noted that the blades cannot be incorrectly seated in their slots, to bring the cutting edges 33, in inoperative position, due to the fact that if a blade should be reversed so as to bring its outer edge 34, toward the thimble 29, the terminal of the cutter would stop the thimble from entering its seat 16 or prevent the proper application of the ring 36.

The purpose of the flange 18, is to receive a retainer ring 36, adapted to be placed thereon after the cutters have been inserted in their several slots 19. This ring 36, is of a size to be held seated in place by frictional engagement with the surfaces 17, of the segments 15, and the edges 34, of the cutters, both of which are engaged by the inner surface 37, of the ring.

The thimble 29, is internally threaded to receive a screw 38, the end 39, of which is threaded into a bore 40, threaded through the center of the plate 14, and the shank 12. The head 41, of the screw 38, is countersunk in the countersink 42, of the head 30, of the thimble and is provided with a driver slot 43, and said screw 38, securely holds all of the elements of the tool in locked relative position.

The V-recesses 21, in the blades 20, are arranged for chamfering the edges of a tube of a particular diameter, and the head 30, of the thimble is of a diameter to snugly fit into that particular tube to form a guide for seating the device upon the tube and grinding the cutting edges upon the inner and outer surfaces of the edge 44, of a tube 45. The device is of a size to conveniently fit into the hand of a user. The shank end 13, is adapted to seat in a socket member 46, having a sliding crank handle 47, when the tool is to be used on a tube of hard material.

It will be obvious that a different set of cutters and a different thimble will be provided for tubes of various sizes. The cutters are provided with bores 48, in order to keep various sizes on different rings or wires. The device is adapted for scraping the burrs from newly cut piping as well as for chamfering the same. A half-turn of the tool will completely clean the pipe end of burrs.

It is thought that persons skilled in the art to which the invention relates will be able to obtain a clear understanding of the invention after considering the desciption in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention, that which I claim as new and desire to procure by Letters Patent is:

1. A chamfering tool comprising a shank portion, an enlarged annular table and a radially slotted boss of a diameter less than said table, a center bore extending through said boss, a plurality of similar generally rectangular blades V-notched at the outer ends thereof and having inwardly disposed toes on the inner ends thereof which latter ends seat on said table, a combined pilot post and thimble insertable in said bore and dimensionally and positionally adapted to guide work onto the tool and to space said blades apart and to engage said toes, and a ring adapted to seat upon said table and to frictionally engage outer edges of said blades to hold said blades against said thimble, said toes preventing accidental insertion of the blades in reversed position.

2. A chamfering tool comprising a shank portion, an enlarged annular table and a radially slotted boss of a diameter less than said table, a center bore extending through said boss, a plurality of similar generally rectangular blades V-notched at the outer ends thereof and having inwardly disposed toes on the inner ends thereof which latter ends seat on said table, a combined pilot post and thimble insertable in said bore and dimensionally and positionally adapted to guide work onto the tool and to space said blades apart and to engage said toes, and a ring adapted to seat upon said table and to frictionally engage outer edges of said blades to hold said blades against said thimble, said toes preventing accidental insertion of the blades in reversed position, said thimble, table and shank being centrally bored and threaded, and a threaded screw having a head adapted to hold said thimble in tight engagement with said blades.

3. A chamfering tool comprising a shank portion, an enlarged annular table and a radially slotted boss of a diameter less than said table, a center bore extending through said boss, a plurality of similar generally rectangular blades V-notched at the outer ends thereof and having inwardly disposed toes on the inner ends thereof which latter ends seat on said table, a thimble insertable in said bore and adapted to space said blades apart and to engage said toes, and a ring adapted to seat upon said table and to frictionally engage outer edges of said blades to hold said blades against said thimble, said toes preventing accidental insertion of the blades in reversed position, said thimble having a head adapted to engage the inner portions of the upper ends of said blades and also being dimensionally adapted as a pilot post to guide work into the V-notches on the said upper ends.

RAYMOND M. GASSMANN.

REFERENCES CITED

The following references are of record in the file of this patent:

UNITED STATES PATENTS

| Number | Name | Date |
| --- | --- | --- |
| 1,499,416 | Stech | July 1, 1924 |
| 1,563,260 | Cromley | Nov. 24, 1925 |
| 2,188,584 | Tyne | Jan. 30, 1940 |